No. 842,499. PATENTED JAN. 29, 1907.
C. G. SCHMIDT.
MEAT CUTTER.
APPLICATION FILED DEC. 11, 1905.
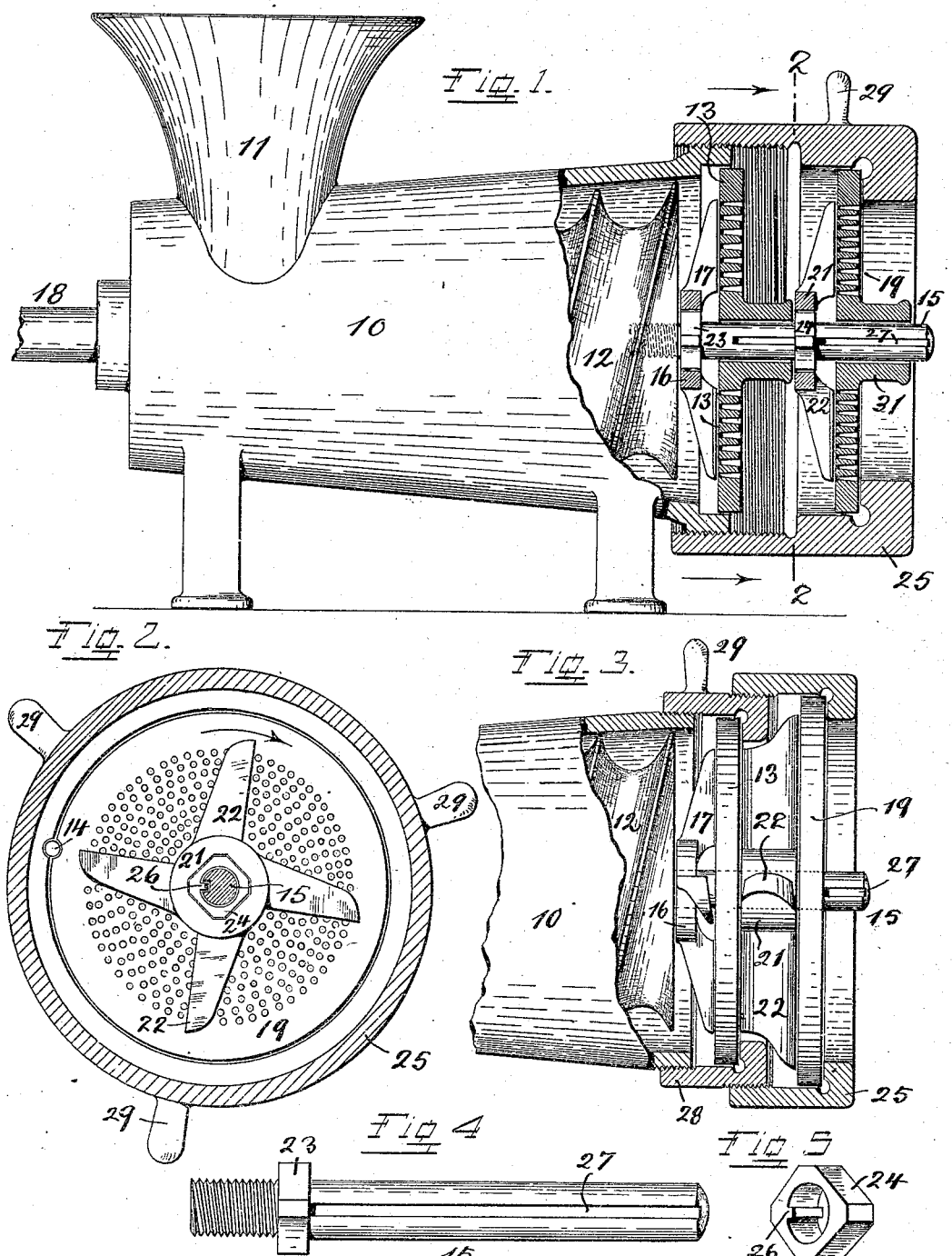
Witnesses.
Homer Bradford.
C. Meyer.
Inventor.
Charles G. Schmidt
by C. Spengel atty

UNITED STATES PATENT OFFICE.

CHARLES G. SCHMIDT, OF CINCINNATI, OHIO, ASSIGNOR TO CINCINNATI BUTCHER'S SUPPLY CO., OF CINCINNATI, OHIO, A CORPORATION OF OHIO.

MEAT-CUTTER.

No. 842,499. Specification of Letters Patent. Patented Jan. 29, 1907.

Application filed December 11, 1905. Serial No. 291,169.

*To all whom it may concern:*

Be it known that I, CHARLES G. SCHMIDT, a citizen of the United States, and residing at Cincinnati, Hamilton county, State of Ohio, have invented certain new and useful Improvements in Meat-Cutters; and I do declare the following to be a clear, full, and exact description of the invention, attention being called to the accompanying drawings, with the reference characters marked thereon, which form also a part of this specification.

This invention relates to improvements in meat-cutters of the kind where a feed device in form of a screw moves the meat against a perforated plate over which a rotary cutter operates for the purpose of cutting the meat, which after reduced passes out by being forced through the perforations in the plate by the meat caused to follow by the continuous action of the screw.

The invention relates to certain devices and constructions whereby with certain given means and power facilities the cutting capacity of the device is increased.

In the following specification, and particularly pointed out in the claim at the end thereof, is found a full description of my invention, together with its operation, parts, and construction, which latter is also illustrated in the accompanying drawings, in which—

Figure 1 shows a side elevation of such a cutter with parts near one end broken away and shown in section. Fig. 2 is a vertical cross-section on line 2 2 of Fig. 1. Fig. 3 is part of a view similar to Fig. 1, the section extending, however, only through the external parts. Fig. 4 is an enlarged side view of the cutter-shaft. Fig. 5 is a perspective view of a certain machine element to be presently described.

10 indicates the housing which receives the meat to be cut, the same being supplied through a hopper 11 and advanced by a feed-screw 12 against a perforated plate 13, held immovably at the end of the housing by suitable means, like a key or pin similar to the one shown at 14 in Fig. 2. From the end of the feed-screw there projects the cutter-shaft 15, upon which the inner cutter-head is mounted for rotation. This cutter-head consists of a hub 16, from which the knives 17 project in suitable numbers. Feed-screw and cutter-shaft, with the cutter-head, rotate together, being driven by any suitable means or power applied to the drive-shaft 18 of the feed-screw, and the arrangement is such that the knives of the cutter-head pass over the inner surface of plate 13 and close thereto, cutting off any meat which has been forced into the perforations thereof. The meat as soon as cut off is continuously pushed through the perforations by the meat which follows behind and is forced toward plate 13 by the feed-screw. This describes construction and action of a well-known type of meat-cutter. In some cases this action is increased by the addition of a second perforated plate 19, similar to plate 13, and by a second cutter-head, consisting of a hub 21 and of knives 22. In such case the perforations in this second plate are smaller than those in the first one, so that an additional and finer reduction results. Different kinds and grades of meat demand different knives and plates for cutting, and, again, the required consistency of the reduced meat differs accordingly to the particular purpose and use for which it is intended. Therefore plates with perforations of various sizes and cutter-heads of various grades are interchangeably used, and the supporting and holding means for these parts are arranged accordingly.

My invention relates more particularly to the construction of these supporting and holding means, they being the cutter-shaft 15 and the means for holding plates 13 and 19 in place, and this construction is such that the usual stock cutter-heads and plates may be readily used without requiring alterations on them, and they may also be readily interchanged or reversed in position—as, for instance, plate 19 may take the place of plate 13, and another plate with still smaller perforations may be mounted in place of it. For such purpose the bore of the hub of each cutter-head is otherwise than round, and a corresponding seat is provided on shaft 15, one for each of these cutter-heads upon which they are mounted, so that provided these seats rotate with the shaft these cutter-heads rotate also. One of these seat members may form a permanent part of shaft 15, at the inner end of which it is located, as shown at 23. The other seat member 24 is removably mounted on shaft 15, but arranged so as to rotate with this latter as soon as in position. The necessity of it being removable is due to the fact that it must be out of the way to permit placing of the inner plate 13, which has merely a circular opening in its center sufficient to clear shaft 15. After this plate is placed in position seat member 24 is slipped onto shaft 15 and pushed up against said plate or its hub. The outer cutter-head is then mounted upon seat 24, and the outer plate 19 is pushed up against it. A collar 25 by bearing all around against the outer side of plate 19 near its edge and holding the same in place by being mounted on the housing confines also all intermediate parts in position.

Rotation of seat member 24 with shaft 15 is preferably secured by a key-and-groove connection, the key 26 being in member 24 and the groove 27 in the shaft. Both seats being alike and the bores of the cutter-heads corresponding, it is clear that these latter may be readily interchanged. Seat member 24 being removably mounted, the machine may be readily taken apart.

The invention permits use of different cutter-heads, as illustrated in Fig. 3. Instead of having them alike as to the formation of the knives the knives of the outer one may be arranged to cut simultaneously against both plates. Each one of the plates may be held by an independent collar, the inner plate being held by a collar 28, mounted upon the open end of housing 10, while collar 25 is mounted upon collar 28. The outer plate may also be larger to insure a freer discharge. The collars may be provided with handles 29 to assist in their removal or attachment. Some of the perforated plates are provided with hubs 31, as shown in Fig. 1, and others are devoid of them, as shown in Fig. 3. My invention is applicable for use in either connection.

Having described my invention, I claim as new—

In a meat-cutter, the combination of a housing open at one end, two perforated plates held immovable thereat and provided with circular, centrally-located openings of equal diameter, a circular cutter-shaft of uniform cross-section supported within the housing and extending outwardly through these central openings which it fully occupies, a feed device adapted to move the meat against the inner plate, a cutter-head between the two, another cutter-head between the two plates, both cutter-heads having centrally-located, polygonal openings of equal size, seat members for them fitted to these openings so as to fully occupy them and mounted so as to rotate with the cutter-shaft, but being endwise removable therefrom, and means to operate this cutter-shaft so as to cause the same to rotate the seat members with the cutter-heads mounted on them.

In testimony whereof I hereunto affix my signature in the presence of two witnesses.

CHARLES G. SCHMIDT.

Witnesses:
  C. Spengel,
  C. Meyer.